United States Patent [19]
Hagan

[11] Patent Number: 5,108,591
[45] Date of Patent: Apr. 28, 1992

[54] OIL SPILL RECOVERY SYSTEM
[75] Inventor: Jesse J. Hagan, Manitowoc, Wis.
[73] Assignee: CS Participation Corp., New York, N.Y.
[21] Appl. No.: 679,949
[22] Filed: Apr. 3, 1991
[51] Int. Cl.$^5$ .............................................. E02B 15/04
[52] U.S. Cl. .................................. 210/104; 210/115; 210/122; 210/123; 210/258; 210/259; 210/242.3; 210/536; 210/923
[58] Field of Search ............... 210/242.3, 923, 104, 210/115, 119, 122, 123, 134, 258, 259, 533, 536, 540

[56] References Cited

U.S. PATENT DOCUMENTS

| | | | |
|---|---|---|---|
| 1,450,545 | 4/1923 | Hans | 210/122 |
| 1,732,222 | 10/1929 | Cantrall | 210/123 |
| 3,642,140 | 2/1972 | Parker | 210/923 |
| 3,690,463 | 9/1972 | O'Brien | 210/923 |
| 3,722,687 | 3/1973 | Stebbins et al. | 210/923 |
| 3,753,496 | 8/1973 | Boyd | 210/923 |
| 3,983,034 | 9/1976 | Wilson | 210/242.3 |
| 4,194,478 | 3/1980 | Crema | 210/242.3 |
| 4,252,649 | 2/1981 | Favret, Jr. | 210/115 |
| 4,405,458 | 9/1983 | McHugh, Jr. | 210/242.3 |
| 4,436,630 | 3/1984 | Anderson | 210/123 |
| 4,521,312 | 6/1985 | Anderson | 210/123 |
| 4,690,513 | 10/1990 | Young | 210/123 |
| 4,892,666 | 1/1990 | Paulson | 210/242.3 |
| 5,030,342 | 7/1991 | Ortega | 210/242.3 |

Primary Examiner—Stanley S. Silverman
Assistant Examiner—Christopher Upton
Attorney, Agent, or Firm—Nilles & Nilles

[57] ABSTRACT

An oil spill recovery system for collecting spilled oil or other petrochemicals from the surface of water, for separating the collected oil and water, and for separately distributing these liquids to desired destinations. Oil is recovered from the surface of water by a collector head that creates a vortex of vacuumed air which lifts and skims the oil from the water. Once the oil is in the collector head, it is transferred to a separation chamber where the oil and water separate. Sensor devices inside the separation chamber monitor the oil/water phase line and the upper oil level. The sensor devices, continuously monitored by a control processor, signal a series of pumps and valves to discharge either water or oil or both when the liquids have reached certain levels within the separation chamber. The control processor has an operational sequence that provides for automatic control of the oil spill recovery system.

15 Claims, 5 Drawing Sheets

OIL SPILL RECOVERY SYSTEM

BACKGROUND OF THE INVENTION

1. Field of the Invention

This invention relates to the recovery of spilled oil from the surface of bodies of water. The invention, through the use of a collector head, a separator tank, and automatic controls, collects oil and water from the surface of the body of water, separates the two liquids into an oil phase and a water phase, and separately discharges the oil and water for further processing. The invention is continuously controlled and monitored by a control processor.

2. Description of the Related Art

The oil spill management industry has had a very problematic history. Oil spill technology has not kept pace with the increase of spilled oil on our waterways. The increasing size and frequency of oil spills in our waterways is devastating the ecologically sensitive environment.

Oil, being lighter than water, floats on the surface and over time it will spread along the water. How far it spreads depends on the type of oil, weather conditions, the roughness of the waves, and time. Oil also hardens as time passes, hampering clean-up efforts even further. Prompt response time is therefore an important factor in oil spill control. However, oil spill control equipment currently used in the industry is limited in application, is quite expensive, and cannot be deployed easily and rapidly. Due to these limitations, most small spills of about 12 bbl or less are left completely untreated, and many moderate spills of about 12 to 1,200 bbl are left untreated or are treated ineffectively.

In addition to deployability problems, most equipment has considerable restrictions on multiple use, i.e. the equipment can only be used on certain types of spills. For instance, most collector head-type skimmers are effective only on calm water, so such devices cannot be used in rough water or strong currents. Further, waves and debris floating on the water disable most collector heads. Separators are often too large for portable use. Combined collector heads and separators typically require considerable support equipment and manpower to deploy and operate effectively. Few manufacturers of oil spill equipment use standard pipe and electrical fittings. This lack of standardized fittings substantially hampers equipment interface and compatibility.

With increasing concern about the environment, oil companies and government authorities are being pressured to clean up more spills than has been done in recent years, and to provide faster response times. The oil spill industry needs affordable, effective equipment so that even the smallest spills can be cleaned up quickly and effectively.

SUMMARY OF THE INVENTION

An improved apparatus for recovering spilled oil from the surface of a body of water is disclosed. The invention comprises three major components—a collector head, a separator tank, and a control processor. The invention is designed to collect, separate and discharge oil and water in one continuous, economical process.

The spill recovery process begins with the use of the collector head. The collector head, powered by a vacuum pump, utilizes a vortex of vacuumed air to lift and skim the spilled oil in an effective way. The novel design of the collector head prevents exorbitant amounts of water from being vacuumed along with the spilled oil product. Since the head collects proportionately more oil than conventional skimmers, this invention is effective from the start. The collector head is designed for effective operation even in rough waters and strong currents. The collector head has a detachable liquid intake pipe to provide for a crevice tool for use in awkward places. Two debris screens provide double protection against clogging of the collector head.

Upon entering the collector head, the oil and water move through a hose to the next part of the invention, the oil/water separator. In the separation chamber the oil and water separate by virtue of their different specific gravities, with the oil floating to the upper portion of the chamber and the water sinking to the lower portion. When the liquids reach predetermined levels within the separation chamber, the oil or water or both are discharged from the separator and pumped to their respective destinations. By separating the oil and water, a more pure oil product is recovered and available for transport to a refining facility. The control processor is designed to automatically operate the system with little or no human supervision after start-up.

The invention provides effective spill response capability under many weather conditions, on spills of varying magnitudes, and one which can be deployed quickly and operated with little supervision. For instance, the invention can be used to clean up spilled oil from a pit or sump, from a flowing river or still pond, from a calm or turbulent lake, and, most importantly, from shipside out in the ocean. Traditionally, each situation has required a separate type of equipment.

The design of this invention provides a lightweight, portable piece of equipment that can be deployed by just one person. Large equipment movers are not required. It can be stored aboard a ship to provide an immediate spill response. The invention is self-contained, needing only an electric power source, such as a portable generator, to power its operation. The invention is not disabled by waves or debris, and operates efficiently in a variety of application situations. This invention utilizes standardized quick couplers and electrical connections, and a standard size container, providing for a superior, yet economical product, particularly with respect to the response needs for the small and moderate spills.

Other objects and advantages of this invention will become apparent from the following description taken in connection with the accompanying drawings which set forth, by way of illustration and example, certain embodiments of this invention.

BRIEF DESCRIPTION OF THE DRAWINGS

The drawings, which constitute part of this specification and include exemplary embodiments of the present invention and illustrate various objects and features of the invention, are as follows.

DETAILED DESCRIPTION OF THE INVENTION

Figure 1:
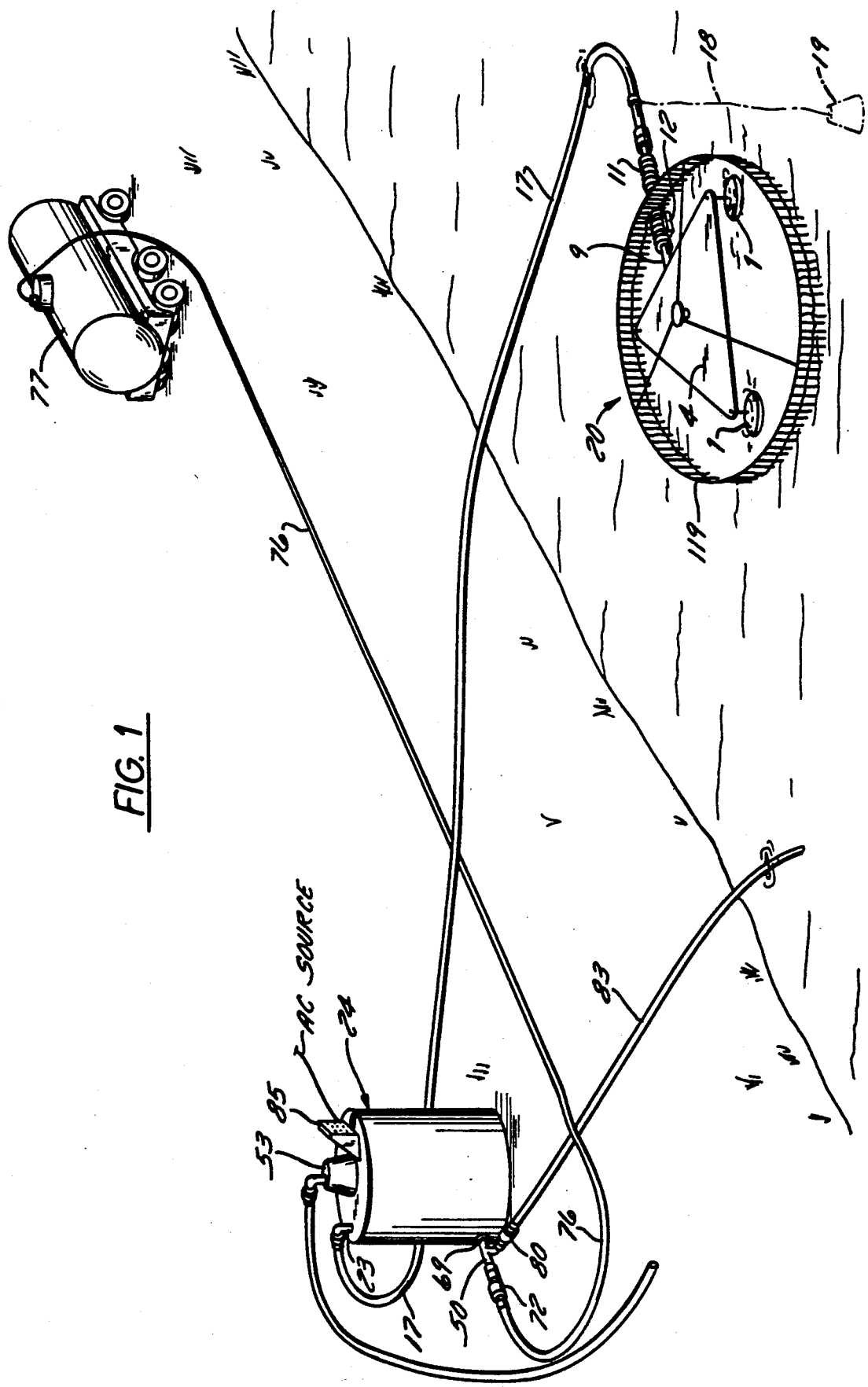
FIG. 1 is a perspective view of the oil spill recovery system deployed at a spill site in accordance with the principles of the invention.

As shown in FIG. 1, the oil spill recovery system of the invention comprises three major components: the collector head 20, the oil/water separator 24, and the control processor 85.

Figure 3:
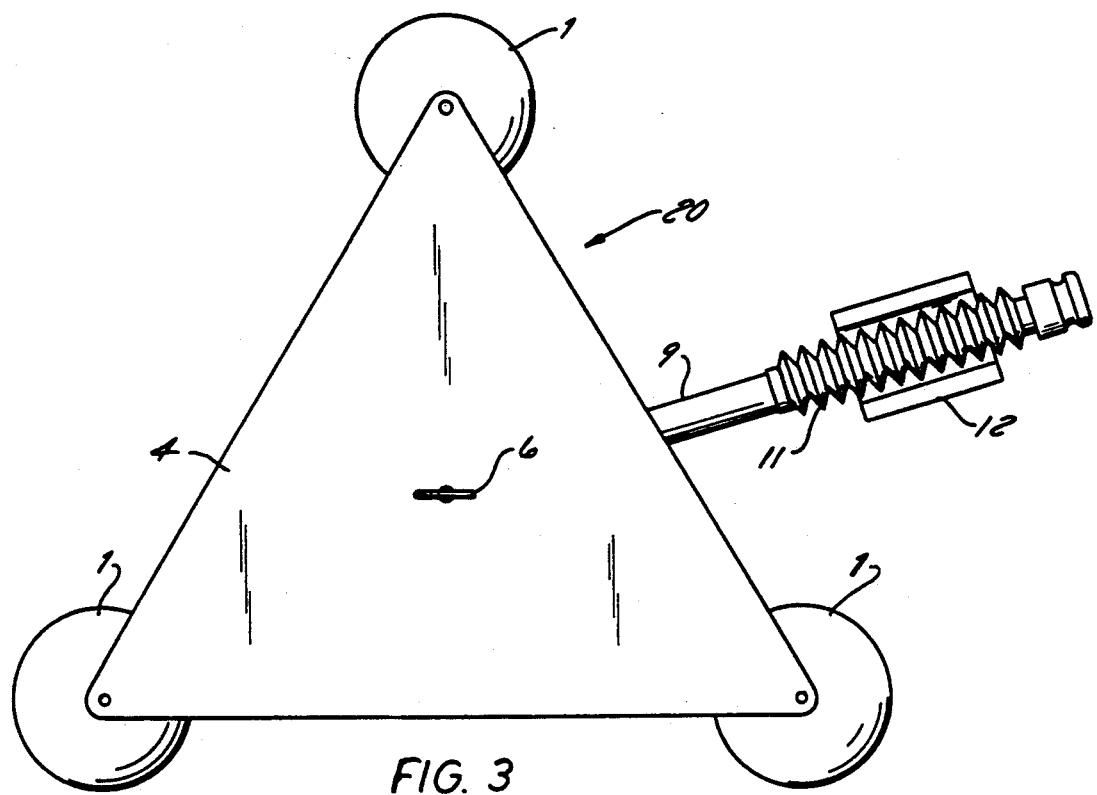
FIG. 3 is a top view of the collector head.
Figure 4:
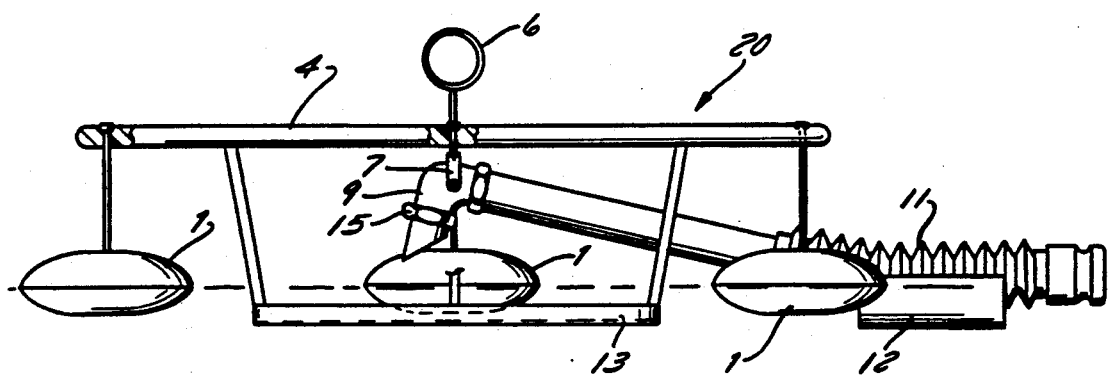
FIG. 4 is a side view of the collector head.

The collector head 20 utilizes suction created by a vacuum pump 53 to lift and skim oil, and usually at least some water, from the surface. Referring to FIGS. 3 and 4, floats 1 connected to a lightweight top plate 4 give buoyancy to the collector head 20. Each float 1 is a circular, double dome shape (top view is circular, side view is elliptical). This flattened spheroid shape is superior to conventional floats (e.g. inverted cones, spheres, cylinders) because it minimizes deflection and drag on the collector head 20 due to currents and waves, allowing the invention to be used in a variety of spill conditions. The floats 1 are adjustably attached to the underside of top plate 4 to support it above the surface of the water. The collector head 20 is ideal for use in shallow water because it floats in as little as one inch of water.

Top plate 4 serves as a structural support for a liquid intake pipe 9 attached to the center of top plate 4 by eye bolt 6 and hinge clasp 7. The top plate 4 is horizontally positioned above surface of the water by the floats 1, and the liquid intake pipe 9 is attached beneath the top plate 4. The top plate 4 is a rigid plate-type structure shaped as an equilateral triangle. The triangular shape helps maintain the liquid intake pipe 9 at an optimal distance between the top plate 4 and the surface of the spill as the collector head 20 rides over waves.

This novel construction of the collector head 20 provides for collection of the spilled oil from above the surface, not below as with other known spill collecting devices. Holes or perforations may be cut in the top plate 4 to allow for drainage from splashing or rain. A hook may be inserted into the eye of the eye bolt 6 to adjust the vertical height of the liquid intake pipe 9 and to move the collector head 20 over the surface of the water. The vertical position of the liquid intake pipe 9 may also be adjusted by adjusting the position of the floats 1 in relation to the top plate 4. Adjusting the vertical distance between the opening of the liquid intake pipe 9 and the surface determines the intake rate of the liquid.

Eye bolt 6 and hinge clasp 7 allow the liquid intake pipe 9 to rotate horizontally and vertically approximately 30° in any direction with respect to the top plate 4. The opening of the liquid intake pipe 9 is cut at a 45° angle to minimize the effects of ripples and waves which would otherwise flood the system and prevent air flow which is needed to create suction.

Oil is vacuumed and collected by the liquid intake pipe 9 and transferred through a flexible hose 11. Flex hose 11, a corrugated neoprene hose connected to the liquid intake pipe 9 and supported by a hose float 12, provides the collector head 20 with the ability to overcome shock and/or turbulence due to wave action, pump surge, or submersion of the liquid intake pipe 9. Hose float 12 provides buoyancy to the flex hose 11, which in turn maintains the length of the L-shaped liquid intake pipe 9 substantially parallel to the surface of the water, and the opening of the liquid intake pipe 9 substantially perpendicular to the surface.

Figure 5:
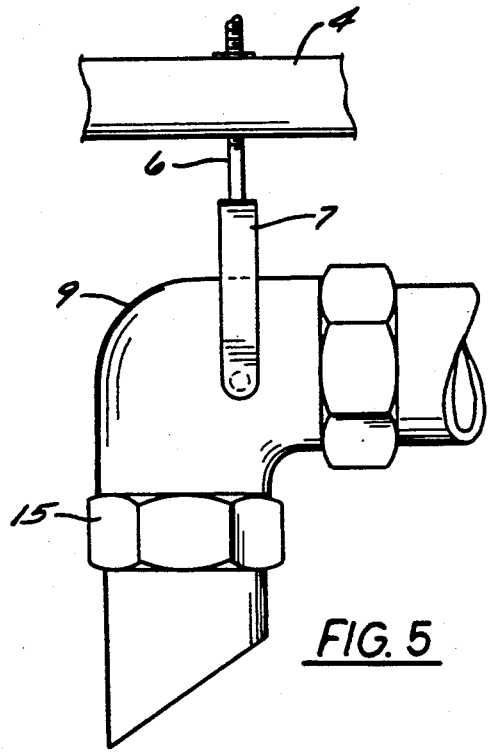
FIG. 5 is a detailed view of the liquid intake pipe assembly on the collector head shown in FIG. 4.
Figure 6:
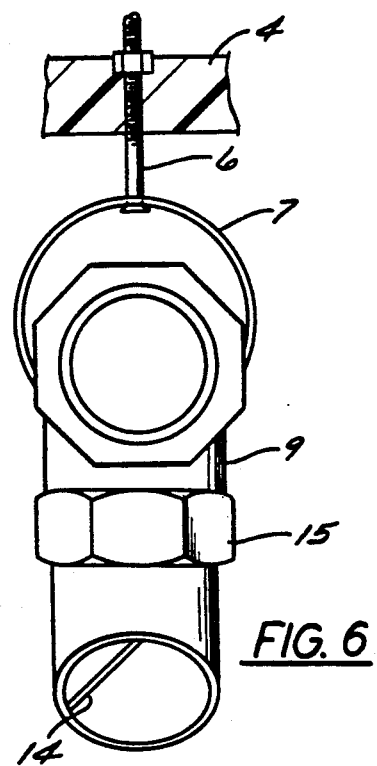
FIG. 6 is a side view of the liquid intake pipe assembly shown in FIG. 5.
Figure 7:
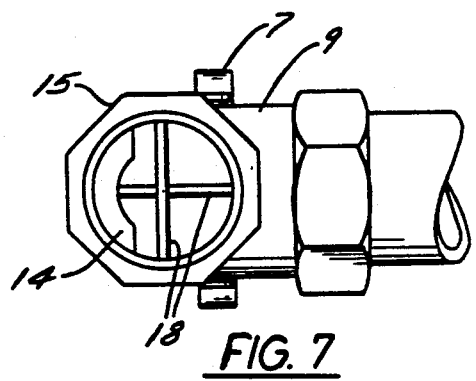
FIG. 7 is a bottom view of the liquid intake pipe assembly shown in FIG. 5.

Referring to FIGS. 5, 6 and 7, an auger fin 14 is affixed to the opening of the liquid intake pipe 9 to provide a vortex of vacuumed air which lifts the oil from the surface of the water. Fin 14 is a small plate cut in a curvilinear fashion and chemically welded in the pipe opening at an inclined position of about 45°. The tornado action of the air vortex also provides the advantage of aerating the oil-water mixture, which causes the oil and water to easily move through hose 17 to the oil/water separator 24.

The opening of the liquid intake pipe 9 is positioned above the surface when utilizing the tornado affect of the fin inside the liquid intake pipe 9. This application is used for slower, smaller spills, or where water discharge purity is critical. When you are in a hurry, or when water quality is not a priority, the opening of the liquid intake pipe 9 may instead protrude into the surface of the water to maximize the power of the vacuum to quickly move large amounts of liquid.

Hinge clasp 7 is a U-shaped spring steel member providing easy detachability of the liquid intake pipe 9 for use as a crevice wand feature suitable for cleaning up spills around edges, in cracks, between rocks, etc. When installing the collector head 20 at a permanent location, such as for a continuous oil leak in a sewer, compression nut 15 provides a gross adjustment of the liquid intake pipe 9.

To prevent debris from clogging the collector head 20, a circular finger screen 119, attached to top plate 4, has vertical finger-like protrusions around the collector head 20 extending above and below the surface of the water. Further, cross screen 118 made of two pins at right angles within the opening to the liquid intake pipe 9 provides additional protection against debris from entering the device. An optional bottom pan 13 may be provided for use on larger, heavier duty (up-scaled) collector head units 20. The pan 13, attached to the top plate 4 and positioned below the liquid intake pipe 9 and below the spill surface, serves as a "weir dam," creating an oil fall (like a water fall) and adds a third measure of protection, in addition to the finger screen 119 and cross screen 118, from ambient debris entering the system.

Hose 17 transfers the liquid from the collector head 20 into the oil/water separator 24. Hose 17 is positioned out in the spill by bungee tether 18 and anchor 19. The bungee tether 18 is a stretchy rubber-like rope, which stabilizes the collector head 20 by absorbing the stress caused by wind and waves. The hose 17 surges when liquid enters it. The hose 17 has a tendency to surge down, backwards, and radially right or left as it gulps up the oil and water, especially in wavy condition or at high velocity vacuum. These problems are overcome by providing the collector head 20 with the neoprene corrugated hose 11, the tripod float configuration 1 and 4, and the all-direction swivel hinge clasp 6 and 7. All of the components are light weight; the entire collector head weighs about 6 pounds—compare that to 80 pounds for other oil spill collector heads.

Having completely described the design of the collector head 20, it is important to emphasize that one of its primary functions is, and this function is one that has eluded all previous practitioners, to gain maximum control of the point of oil collection. In essence, the tornado effect of the liquid intake pipe 9 creates a path of least resistance or depression in the surface tension of the spill —the oil has to flow toward the collector head 20. This depression in surface tension is accomplished from above the surface, not below. The particular control that the collector head 20 exercises over the point of oil collection is accomplished by the vortex of air (not liquid), the tornado, which lifts the oil, up, from above, and has a unique tendency to create a depressed-surface-tension-area. Since the neighboring oil will travel in the direction of least resistance, the oil must flow toward the collector head 20.

Liquid collected by the collector head 20 and transferred through hose 17 enters the oil/water separator 24 through the liquid inlet opening 23. A venturi type vacuum motor or pump 53 located on top of the oil/water separator 24 allows the system to be self-contained and portable. The vacuum pump 53, by creating a vacuum within a chamber 26 in the separator 24, provides a source of vacuumed air to the liquid intake pipe 9 of the collector head 20 for lifting and skimming the oil from the surface and for transferring the liquid to the separation chamber 26. A venturi type pump is preferred over a positive displacement pump because it recovers rapidly in the event the liquid intake pipe 9 of the collector head 20 is submerged. The oil/water separator 24 is sealed to maintain a vacuum in the separator 24.

A remote charge tank option may be used to provide the vacuum necessary to lift and carry liquid from the spill surface into the charge tank where a pump inside the charge tank then pumps the liquid into the separation chamber 26 of the oil/water separator 24, In this case, the vacuum source can be remote from the oil/water separator 24.

Inside the separation chamber 26, the oil and water separate into an oil phase and a water phase by virtue of their different specific gravities. One embodiment of the invention utilizes a 55 gallon drum as the separation chamber 26, which provides for a convenient, economical, portable unit. It should be noted, however, that a large variety of vessels can be employed to serve the same function, including an open-ended, tube-like vessel for ocean spills.

The oil/water mixture enters the separation chamber 26 from above at opening 23. The separator 24 maintains a phase thickness (depth) of oil sufficient to force the water and oil separation. The liquid mixture coming into the separation chamber 20 lands first on top of the oil phase; then, water trickles through the oil phase as it gravitates down to the water phase. As the water passes through the oil phase, the water has a tendency to let go of its oil content, i.e. oil molecules attract each other. Depositing the oil/water mixture from above and down through the oil phase therefore facilitates the separation process. The control processor 85 (discussed below) has a segment of logic that maximizes the release of oil from the water by pumping only a small amount of oil per pump cycle; thus, minimal pumping helps maintain a thick or deep oil phase.

Within the separation chamber 26 is a pump stand 28 to support water pump 29 and oil pump 30, which are operated by control processor 85. Pumps 29 and 30 are of a sump pump design to allow the invention to be self-contained and portable, and to avoid the problems created by loss of head pressure. Hoses 33 and 34 provide a means for liquid discharge from water pump 29 and oil pump 30, respectively.

Figure 2:
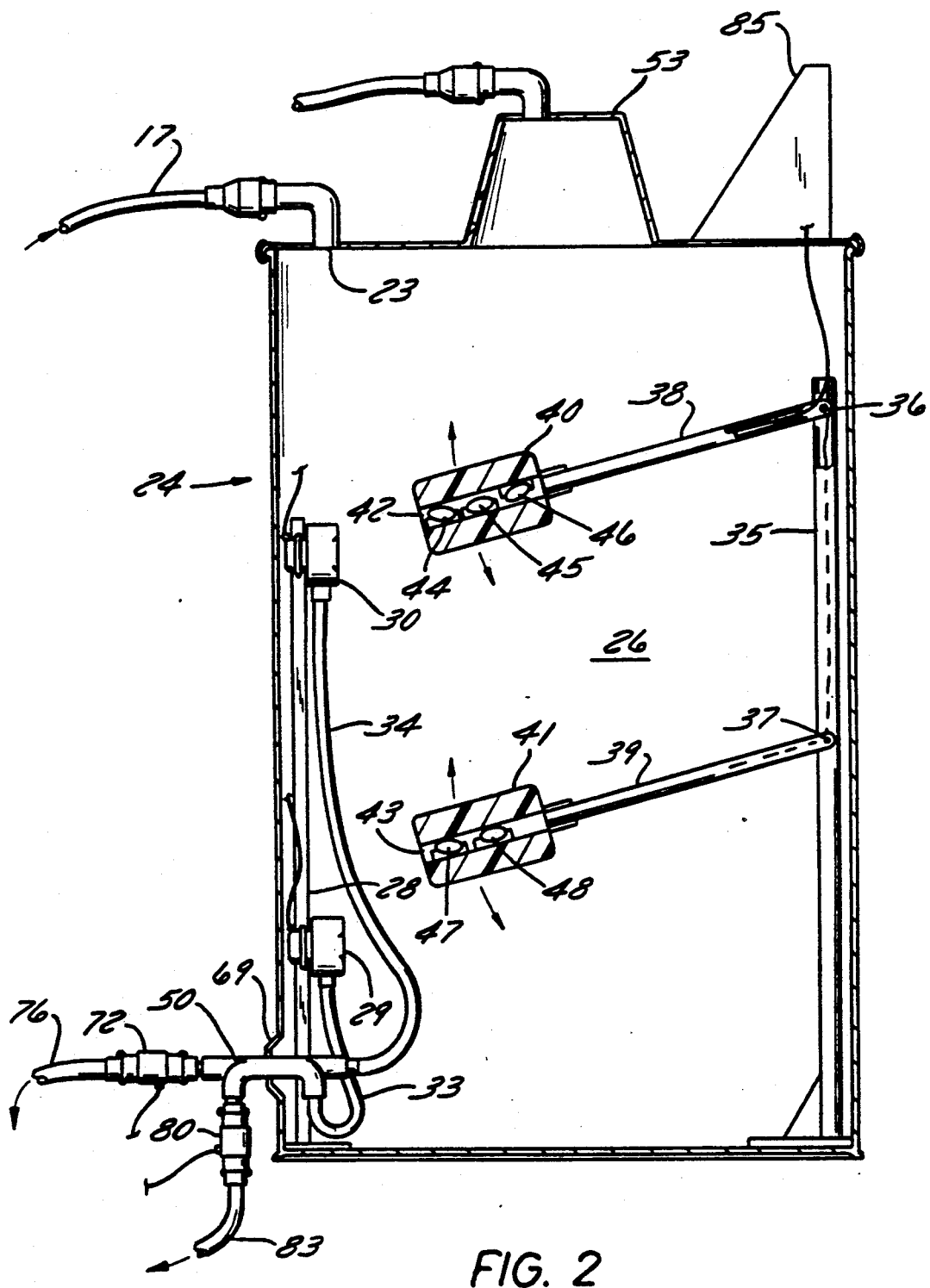
FIG. 2 is a mid-section view of the oil/water separator.
Figure 8:
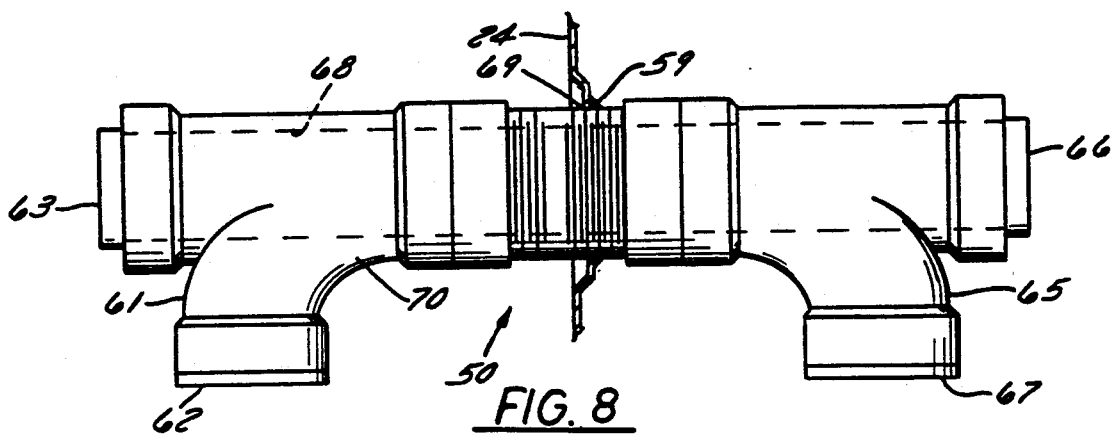
FIG. 8 is a detailed view of the discharge manifold shown in FIGS. 1 and 2.
Figure 9A:
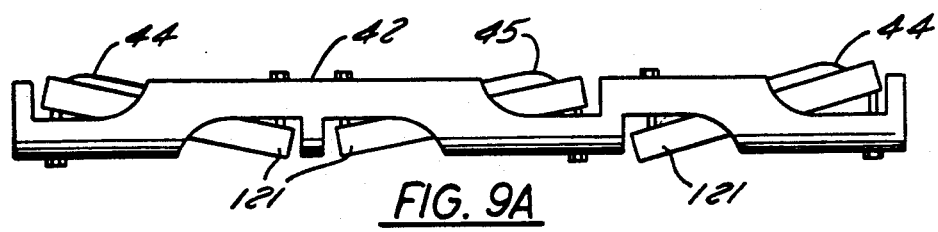
FIGS. 9A and 9B are side views of the mercury level switches in the liquid level monitors shown in FIG. 2.
Figure 9B:
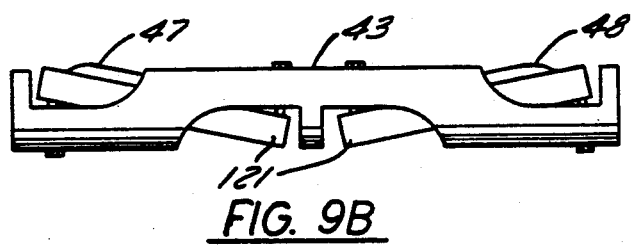
Figure 10:
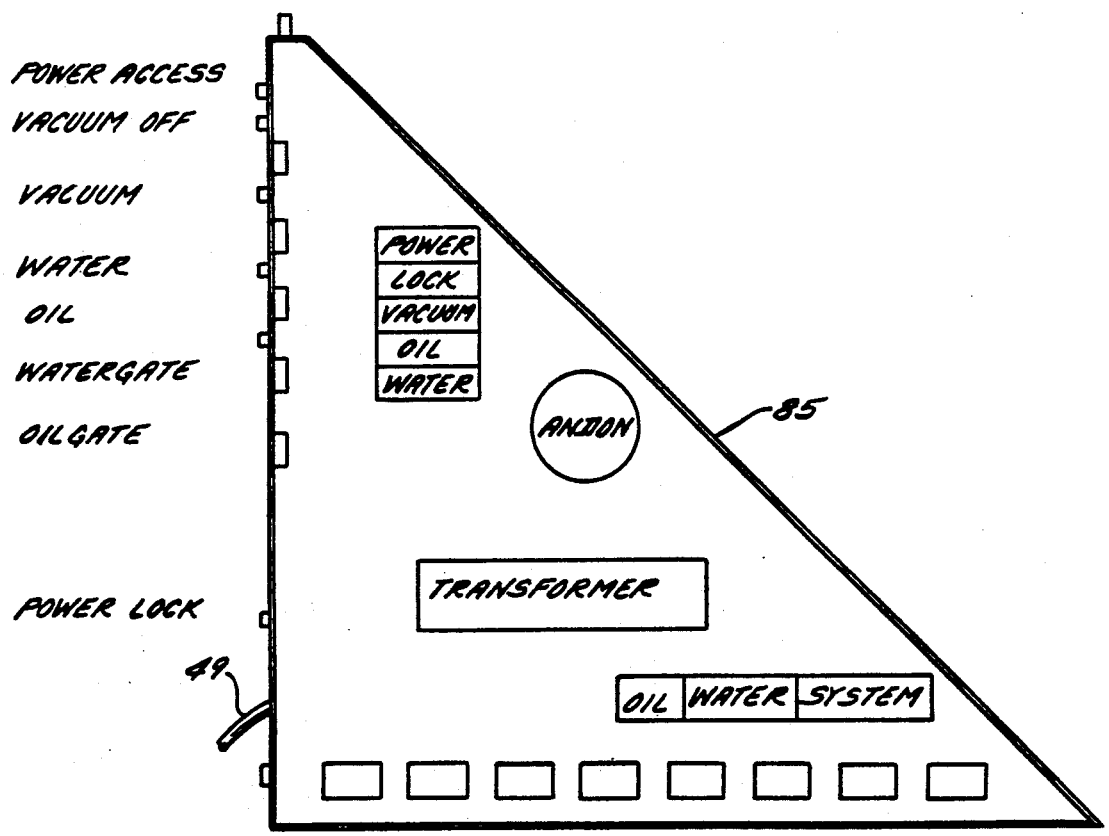
FIG. 10 is a side view of the control panel.

Referring to FIGS. 1, 2 and 8, both the oil and water are separately discharged from the oil/water separator 24 through a manifold 50 which passes through opening 69 of the separator 24. The unique design of the manifold 50 permits the discharge of both oil and water through one orifice in the separator wall without mixing. The manifold 50 is chemically welded 59 at opening 69 of the wall. The parts of the manifold 50 inside of the separator 24 comprise Y pipe 61 and reducer bushings 62 and 63. Hoses 33 and 34 are clamped to bushings 62 and 63, respectively. The external parts of the manifold 50 comprise Y pipe 65 and reducer bushings 66, 67. Discharge of the oil product is provided by throughput pipe 68, which passes through the center of the manifold 50 between reducer bushings 63 and 66. Water is discharged through a passage chamber 70 surrounding throughput pipe 68 and within Y pipes 61 and 65, i.e. water flows between reducer bushings 62 and 67. Throughput pipe 68 prevents the mixing of oil and water as the two liquids pass through the manifold 50 simultaneously.

Referring again to FIGS. 1 and 2, oil gate valve 72 connected to the manifold at 66 controls the discharge of oil from the separator 24. One end of discharge hose 76 is connected to oil gate valve 72 and the opposite end ultimately empties into an oil storage station 77, such as a tanker truck. Water gate valve 80, connected to the manifold at 67, controls the discharge of water from the separator 24. The discharge end of hose 83 may be placed at a point to return the water to the environment or connected to a filtration device. Gate valves 72 and 80 are preferably full-port ball valves fitted with control actuators.

Therefore, upon separating and settling at the upper portion of the separation chamber 26, oil is pumped out through oil pump 30, hose 34, reducer bushing 63, throughput pipe 68 of the manifold 50, reducer bushing 66, oil gate valve 72, hose 76 and discharged into storage tank 77. Water is similarly pumped out through water pump 29, hose 33, bushing 62, through passage chamber 70 of the manifold 50, bushing 67, water gate valve 80, and discharged through hose 83 back to the body of water.

Inside the separation chamber 26, sensors monitor the level of all liquid in the chamber (which corresponds to the upper level of the oil phase since oil floats on top of water) and the phase line between the oil phase and water phase. The sensor assemblies comprise an upper sensor arm 38 and a lower sensor arm 39 hinged at 36 and 37, respectively, to a hollow square tube stud channel 35. Stud channel 35 provides structural support for sensor arms 38 and 39 while serving as a channel for control wires. At the opposite end of sensor arms 38 and 39 are sensor bulbs 40 and 41, respectively. Sensor bulb 40 tracks the upper level of the oil phase, and sensor bulb 41 tracks the oil/water phase line. The lightweight, bottle-shaped sensor bulbs 40 and 41 are permanently affixed to sensor arms 38 and 39, respectively.

Each sensor bulb 40, 41 has an adjustable buoyancy depending on the type and amount of liquid inserted into the bulb. Sensor bulbs 40, 41 are sealed to keep the liquid in and contaminants out. The liquid inside sensor bulb 40 consists of lightweight oil. Sensor bulb 40 is calibrated to the proper buoyancy by injecting an appropriate amount of air so that the top of the bulb 40 floats on the surface of the liquid inside the separation chamber, i.e. on the upper surface of the oil. Within sensor bulb 40 and inserted and sealed inside the free end of sensor arm 38 is switch block 42 with adjustable switch sleeves 121 which provide a base of support and means for calibrating mercury level switches 44, 45 and 46 which monitor the tilt angle of the sensor arm 38. Switch 45 is calibrated to signal the control processor 85 when the oil level rises to a predetermined level in the separation chamber 26 to start the oil pump 30 and open oil gate valve 72 to discharge the oil. Switch 44 is calibrated to signal the control processor 85 to stop the oil pump 30 and close oil gate valve 72 when the oil lever drops to a predetermined level. Switch 46 is calibrated to signal the control processor 85 to shut down the entire system if an overflow situation should occur.

The liquids inside sensor bulb 41 consist of lightweight oil and water at a 1:1 ratio, so that the bulb 41 floats at the oil/water phase line within the separation chamber 26. Inside sensor bulb 41 and inserted and sealed inside the free end of sensor arm 39 is switch block 43 with adjustable switch sleeve 121 which provide a support base and means for calibrating mercury level switches 47 and 48. Switch 48 is calibrated to signal the control processor 85 when the oil/water phase line rises to a predetermined level in the separation chamber 26 to start the water pump 29 and open water gate valve 80 to discharge the water. Switch 47 is calibrated to signal the control processor 85 to stop water pump 29 and close water gate valve 80 when the oil/water phase line drops to a predetermined minimum level. The sensor means for monitoring the liquid levels inside the separation chamber may alternatively comprise a capacitance level sensor or an optical level sensor.

The electrical signals from the mercury switches 44, 45, 46, 47 and 48 in sensor bulbs 40, 41 are transmitted through wire bundle 49, which passes through sensor arms 38, 39, up through hollow stud channel 35 and into control processor 85. The control processor 85 is in turn electrically connected to oil pump 30, water pump 29, oil gate valve 72, water gate valve 80, and the vacuum pump 53. Control processor 85 situated on top of the separator 24 houses a series of switches, indicators, relays, counters and wiring combinations, which provide power to the pumps, receive sensing signals, and send power and signals to the pumps, gate valves and vacuum motor. A programmable logic controller is programmed with the appropriate instructions to operate the electrical components in accordance with the functions set forth herein.

With respect to deployment of the invention, after arriving at the spill site, a technician positions the oil/water separator 24 close to the water's edge. Once the separator 24 is set up in a level position, the technician sets the collector head 20 into the water and connects one end of hose 17 to flex hose 11, and the other end to the liquid inlet opening 23 of the separator 24. Hose 83 is attached to water gate valve 80, and hose 76 is attached to oil gate valve 72. The opposite end of hose 83 is positioned at the shoreline so that the discharged water is returned to its source, and the other end of hose 76 is hooked up to oil storage tanks or tanker truck 77 for collection of the oil. All hose connections to the various components are made with appropriate quick coupler devices.

Power is provided to the system through intrinsically safe control and power connections of the control processor 85 located on top of the separator 24. The control processor's logic begins by initiating the vacuum pump 53, which in turn automatically initiates all other functions of the system. The system is primed with liquid by holding oil intake pipe 9 below the spill surface until either water or oil discharges through hose 83 or 76, respectively. For instance, if there is only a one-inch oil slick on top of the water, then by submerging the liquid intake pipe 9, water will prime the system and discharge first; this is the preferred scenario. However, if there is a twelve-inch oil slick on top the water, or a slick of oil on dry land (in the case of a crack & crevice spill), then oil will discharge first. From that point on, oil and water will continuously enter the separator 24 and will be intermittently discharged. That is, either oil or water or both, depending upon the level of sensor bulbs 40, 41 will be discharged. When the appropriate level of water is reached, sensor bulb 41 will signal water pump 29 to turn on and open gate valve 80 to remove some of the water from the separator 24. Sensor bulb 40 will activate oil pump 30 and open gate valve 72 when there is sufficient oil to discharge. This process is continuous until the operator shuts down and drains the system at the end of the oil spill clean-up activity.

The references to oil, oil spills, etc., are meant to include all types of petroleum, petrochemicals, gasoline, fuel, hydrocarbons and so forth which are susceptible to spillage on and into waterways, such as by tanker spills, inadvertent discharges, ruptured pipelines, and similar events. By referring to oil in the specification and claims, it is understood by the scope and spirit of the invention that it is intended for use in the recovery of all types of liquid which have a tendency to separate from and float on top of water, and particularly to such liquids as crude oil, No. 2 fuel oil, light oil and similar grades. The invention may be used with other conventional oil spill response equipment, such as booms, to confine the spill and otherwise supplement the operation of the invention to clean up the spill.

It is to be understood that the embodiments disclosed above are merely exemplary of the invention which may be embodied in various forms. Therefore, specific structural and functional details disclosed above are not to be interpreted as limiting, but merely as a basis for the claims and as a representative basis for teaching one skilled in the art to variously employ the present invention in any appropriately detailed structure. Changes may be made in the details of construction, arrangement and operation of the invention without departing from the spirit of the invention, especially as defined in the following claims.

I claim:

1. An apparatus for recovering spilled oil from the surface of a body of water comprising:
   (a) a collector head for lifting and skimming oil and water from the surface, the collector head comprising,
       (1) floats supporting a top plate above the surface;
       (2) a liquid intake pipe attached to the top plate with the liquid intake pipe having an angular opening below said top plate with an auger fin in the opening thereof for providing a vortex of vacuumed air, and the liquid intake pipe being supported by means allowing vertical adjustment between the top plate and the surface, and horizontal and vertical rotation with respect to the top plate;
       (3) a flexible hose connected to the liquid intake pipe;

(b) an oil/water separator comprising;
  (1) a separation chamber for receiving oil and water collected from the collector head and for separating the oil and water into an oil phase and a water phase;
  (2) a vacuum pump means for transferring oil and water from the collector head to the separation chamber;
  (3) an oil pump for discharging oil from the separation chamber;
  (4) a water pump for discharging water from the separation chamber;
  (5) first sensor means for monitoring the level of all liquid in the separation chamber;
  (6) second sensor means for monitoring the phase line between the oil phase and water phase;
(c) hose means between the flex hose of the collector head and the separation chamber for transferring oil and water therebetween; and,
(d) a control processor, responsive to electrical signals from the first and second sensor means, for controlling the vacuum pump, oil pump and water pump.

2. The apparatus according to claim 1, with the floats having a flattened spheroidal shape; the top plate having an equilateral triangular shape; and the intake pipe being connected to the center of the top plate.

3. The apparatus according to claim 1, with the collector head further comprising a finger screen around the collector head, and a cross pin screen within the opening of the liquid intake pipe.

4. The apparatus according to claim 1, wherein the liquid intake pipe is detachable from the top plate for use as a crevice tool.

5. The apparatus according to claim 1, wherein the auger fin comprises a curvilinear plate attached to the opening of the oil intake pipe at an inclined position.

6. The apparatus according to claim 1, wherein the collector head further comprises a bottom pan attached to the top plate and positioned below the liquid intake pipe and below the surface.

7. The apparatus according to claim 1, wherein in the first sensor means comprises an upper sensor arm, and the second sensor means comprises a lower sensor arm, each of the sensor arms being hinged to a stud channel within the separation chamber and each comprising;
  a sensor bulb having an adjustable buoyancy; and
  a plurality of level switches, each switch being separately calibrated to provide an electrical signal when its corresponding sensor arm rises or lowers to a predetermined position.

8. The apparatus according to claim 7, wherein the buoyancy of the sensor bulb on the upper sensor arm is adjusted so that it floats at the upper surface of the oil phase in the separation chamber; and wherein the buoyancy of the sensor bulb on the lower sensor arm is adjusted so that it floats at the phase line between the oil phase and water phase.

9. The apparatus according to claim 8, wherein the upper sensor arm further comprises a first level switch calibrated to signal the control processor to start the oil pump when the oil rises to a predetermined level within the separation chamber, a second level switch calibrated to signal the control processor to stop the oil pump when the oil level drops to a predetermined level, and a third level switch calibrated to signal the control process to shut down the entire system in the event of an overflow; and wherein the lower sensor arm further comprises a fourth level switch calibrated to signal the control processor to start the water pump when the oil/water phase line rises to a predetermined level, and a fifth level switch calibrated to signal the control processor to stop the water pump when the oil/water phase line drops to a predetermined level.

10. The apparatus according to claim 9, wherein each of the level switches is a mercury level switch calibrated to monitor a predetermined tilt angle of its respective sensor arm.

11. The apparatus according to claim 1, wherein the first and second sensor means each comprise a capacitance sensor.

12. The apparatus according to claim 1, wherein the first and second sensor means each comprise an optical level sensor.

13. The apparatus according to claim 1, wherein the oil pump and water pump are within the separation chamber.

14. The apparatus according to claim 13, further comprising a discharge manifold having an oil passageway connected to the oil pump and a water passageway connected to the water pump for separately discharging the oil and water through a single opening in the wall of the separation chamber.

15. The apparatus according to claim 14, further comprising an oil gate valve and a water gate valve connected to the discharge manifold for controlling the discharge of oil and water therefrom.

* * * * *